United States Patent Office 3,298,660
Patented Jan. 17, 1967

3,298,660
DIAPHRAGM VALVE ACTUATOR CONSTRUCTION
Richard Hector Price and Charles Roy Jarrett, Cwmbran, England, assignors to Saunders Valve Company Limited, Cwmbran, England, a British company
Filed May 14, 1963, Ser. No. 280,769
Claims priority, application Great Britain, May 16, 1962, 18,905/62
3 Claims. (Cl. 251—331)

The present invention relates to diaphragm valves having a casing with a bore therethrough, and a lateral opening extending inward from a clamping surface on the casing against which the margin of the diaphragm is clamped, a seating formed in the casing, an actuator matching the diaphragm in the closed position of the valve and connected with the diaphragm by a stud with its head embedded in the centre portion of the diaphragm and a threaded shank, projecting from the centre portion of the diaphragm on the inside (i.e. the side away from the bore), and means to move the actuator between a position in which it presses the diaphragm against the seating to close the valve and a position in which it retracts the diaphragm to open the valve. It is especially concerned with such diaphragm valves in which the bore is a straight bore which can be rodded through, and the lateral opening tapers inwards conically, running from a rounded junction with the surface against which the margin of the diaphragm is clamped, and at its inner end merging into the valve bore. In cross section transverse to the valve casing taken through the axis of the opening, the converging sides of the opening run tangentially into the cross section of the bore. In such a valve the seating is constituted by a narrow zone round the bore inward of the tangent points and a zone along each side along the sides of the opening and over the rounded junction, up to the surface against which the diaphragm is clamped. A valve of this kind is disclosed in patent specification No. Re. 24,350 and an improvement in the diaphragm thereof in patent specification No. 2,840,339.

Under practical manufacturing conditions it is found that though in the outer part of the tapered lateral opening where wide surface contact is made, a seal is produced under the pressure of the actuator slight leakage may occur in the neighbourhood of the rounding over where the tapering wall of the valve casing runs into the surface against which the margin of the diaphragm is clamped. The tolerances which have to be allowed make it impracticable to provide the actuator with a turnover corresponding to the aforesaid rounding because this might result in excessive pressure on the diaphragm at this region before the rounded centre of the diaphragm is pressed sufficiently hard against the valve bore to make a good seal in this region. It has therefore been the practice to proportion the parts so that when the diaphragm is depressed sufficiently tightly in the centre part and the sides of the tapering part to make a good seal the diaphragm is stretched sufficiently over the aforesaid rounding to make a good seal in this region.

When the diaphragm stud is screwed into the actuator, the holes in its margin for the clamping bolts may not line up, necessitating slight unscrewing of the stud to bring the bolt holes into line. This and the tolerances which must be allowed for economic manufacture, especially in larger sizes, have the result that sufficient stretch of the diaphragm over the aforesaid rounding may not be achieved until heavier pressure is put on the stud itself than is desirable, in that the pressure may be such that the head of the embedded stud ruptures the rubber or the like surrounding it. This can be avoided by confining the function of the stud to pulling the diaphragm in opening the valve and not conveying pressure when the valve is closed, for which purpose lost motion must be provided between the stud and the actuator, the parts being proportioned so that the valve is fully closed by the actuator before any substantial pressure is applied to the stud.

It will be understood that the amount of lost motion needed to be provided is quite small and it is provided according to the invention by arranging for the stud to screw into a separate nut member which is held in the actuator so that it has sufficient axial freedom to provide the required range of lost motion but is prevented from rotating in relation to the actuator.

The invention will be further described with reference to the accompanying drawings in which FIG. 1 shows a complete valve of the kind in question in the closed position incorporating the invention in one exemplary form, taken on the axis of the actuator and diaphragm.

The valve illustrated is on the lines disclosed in the aforesaid specification No. Re. 24,350 and only those parts which are affected or modified to embody the present invention will be described.

Figure 3:
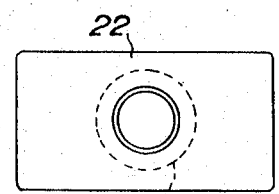
FIG. 3 is a plan view on an enlarged scale of the nut used in FIG. 1 to attach the diaphragm to the actuator.

To provide convenient assembly the actuator which presses the diaphragm into the colsed opsition is made in two parts. The nut member 11 to receive the stud 12 is slipped into one of these parts and the other is then secured to the first part retaining the nut in place. The first part may comprise a conical casting 13 with a flat bottom 14 to engage the flat inner surface of the nose of the diaphragm, and also having an internal flange 15. A cylindrical part 16 of the nut member fits with a little clearance in a central aperture 17 in the flat bottom of this part of the actuator, giving the nut member some radial play in relation to the actuator. The other part 18 of the actuator is tubular with an external flange 19 at an appropriate position along its length to enable it to be bolted to the internal flange 15 of the first part. Desirably the flange 19 is spigoted into the flange 15. The lower end of this second part comes near to the inside of the flat bottom of the first part but is notched on both sides at diametrically opposite zones 21 to receive loosely arms 22 on the nut member 11. The width of the notches is such that their sides form abutment surfaces which are spaced circumferentially to prevent relative rotation between the nut and acuator. The nut is free to move axially by a distance determined by the thickness of the arms and the depth of the notches 21 or more precisely a distance which is limited by abutment surfaces constituted by the tops of the notches and the inside of the flat bottom of the part 13. The two arms 22 of the nut member may as shown in FIG. 3 be constituted by the halves of a rectangular flange. The outer end of the second part has an internal flange 23 against which a separate nut 24 which engages the valve spindle 25 abuts, the nut 24 being retained by a ring 26 bolted to the outer end of the actuator. This part also has projecting transverse slotted arms 27 which engage ribs 28 in the bonnet of the valve to prevent the actuator from rotating.

Figure 1:
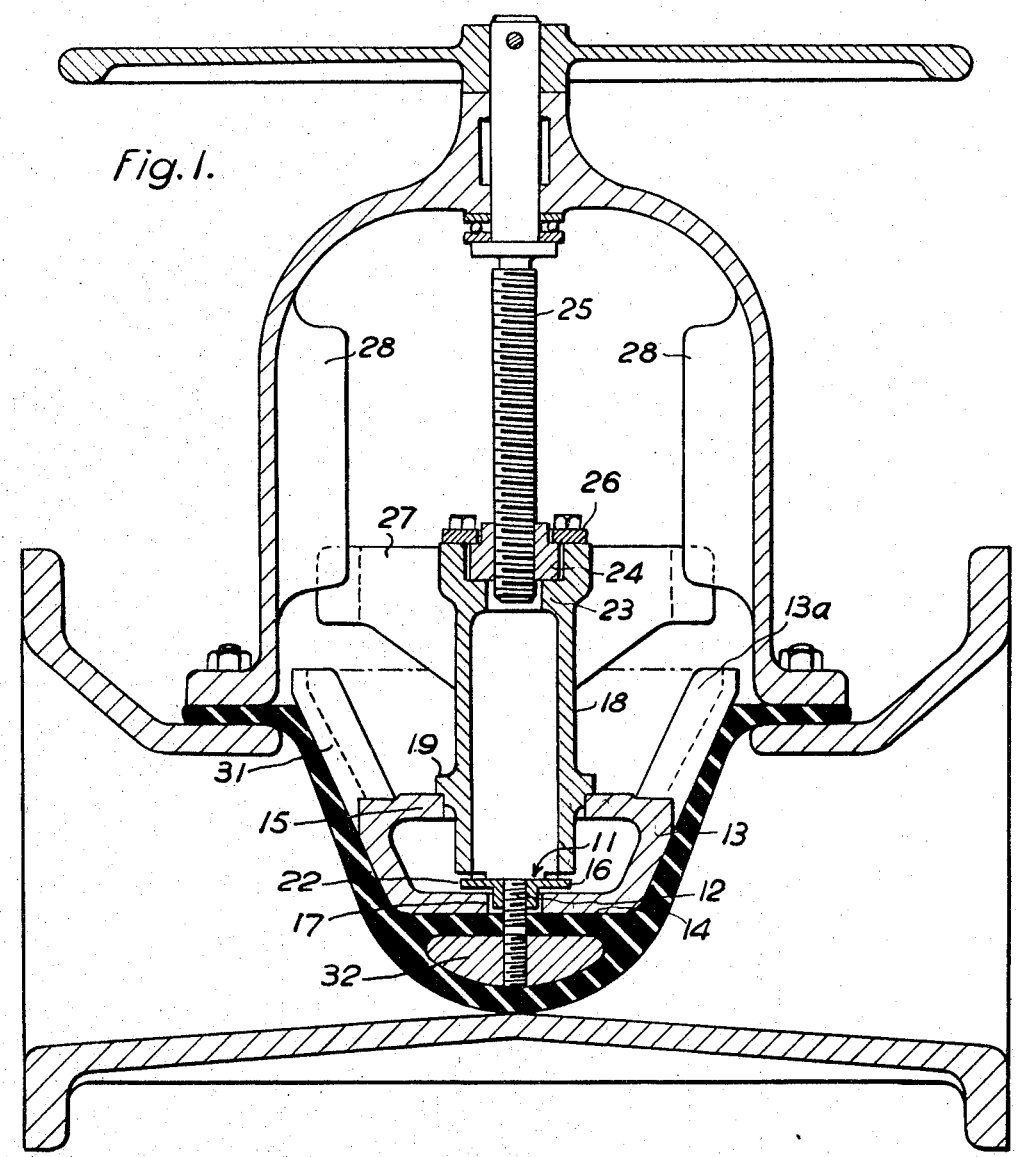
FIG. 1a is a traverse section taken on the axis of the actuator and diaphragm.
Figure 1A:
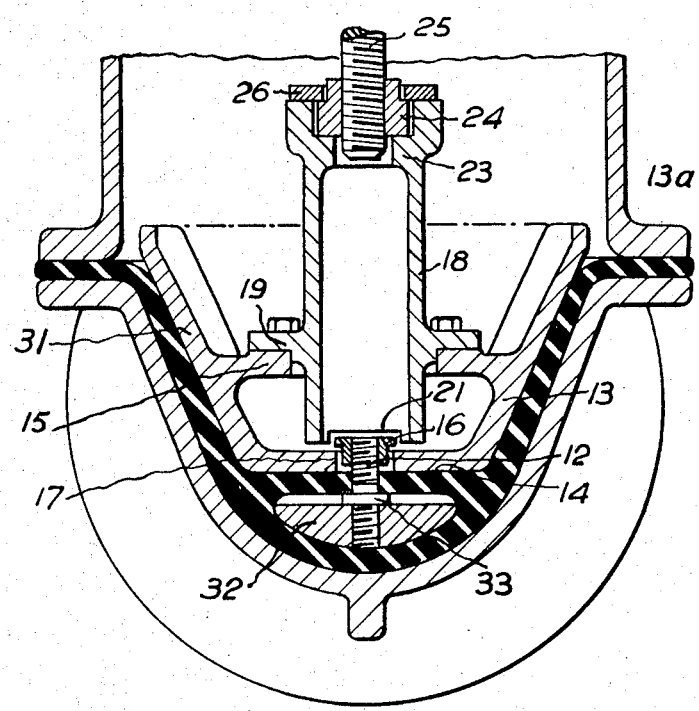
Figure 2:
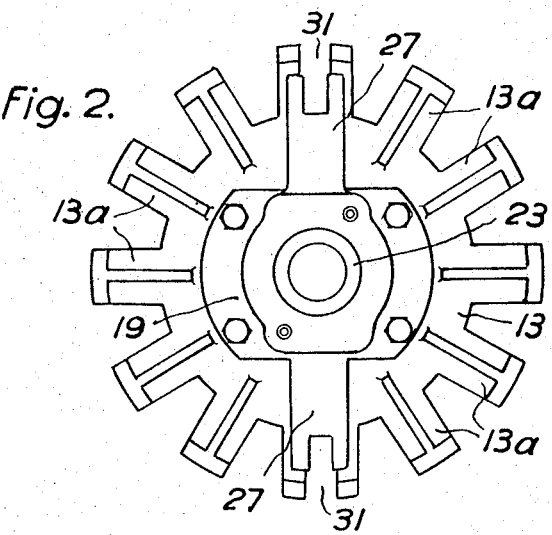
FIG. 2 is a plan view of the actuator.

The second part 18, 19, 23 of the actuator may as in FIGS. 1 to 3 be in one piece or if preferred, as in FIG.

4 the tubular part below the flange 19 may consist of a separate tube 18a let into a counter-bore in the rest of the second part, the separate tube being retained by bolts 29.

The outer conical surface of the first part of the actuator need not be continuous but may be made up of a plurality of arms 13a disposed to bear against ribs on the inside of the diaphragm D. The appropriate pair of arms, if their disposition requires, are slotted at 31 FIG. 2 to clear the ribs 28 in the bonnet.

The stud 12 may be provided with a relatively large metal (aluminium) head 32 of mushroom form embedded in the centre portion or nose of the diaphragm. This may be separate from the shank of the stud which screws into the head and is locked by a cross pin 33.

Figure 5:
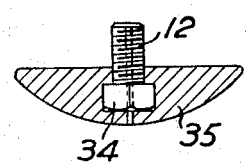
FIGS. 5 and 6 are detail sections showing alternative methods of providing the embedded head of the stud.
Figure 6:
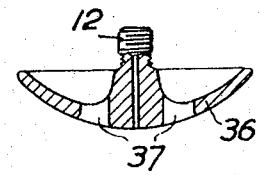
Figure 4:
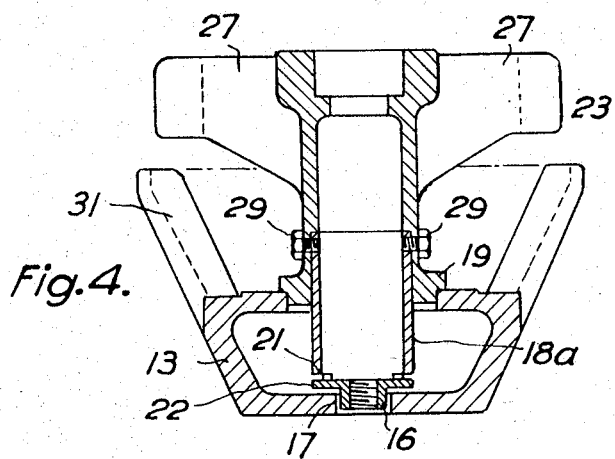
FIG. 4 is a section taken on the same plane as the left hand side of FIG. 1 of a detail modification of the actuator.

Instead of screwing the stud 12 into a separate head and pinning it, it may have an integral head 34 which is cast into a large metal (aluminium) head 35 as in FIG. 5, or the stud 12 may be integral with a (malleable iron) head 36 as in FIG. 6. There may be holes 37 on the metal head through which the diaphragm material extends and the same provision can be made in the construction of FIG. 1.

FIG. 1 illustrates the effect of incorporating the invention. It will be seen that with the valve closed the bottom surface 14 of the actuator is pressing on the internal flat surface of the nose of the diaphragm, but there is clearance between the arms 22 of the nut 11 and the top of the notches 21 so that there is no direct pressure by the actuator on the nut 11 and stud 12. The parts are proportioned and located so that this position is reached when the diaphragm has been pressed firmly down at the nose and at the conical side and the rounded portion joining the conical part to the clamped margin has been well stretched over the rounded edge of the clamping surface on the valve casing. A comparatively small value of the lost motion provided by the greater depth of the notches 21 than the thickness of the arms 22 suffices to give the tolerance required in practical manufacture. The radial play between the nut member and the actuator also enables the diaphragm to centralise itself in relation to the valve casing and actuator.

When the actuator is retracted to open the valve, at first the diaphragm remains behind, but the lost motion is soon taken up and diaphragm is then positively withdrawn from the seating by the continued movement of the actuator.

We claim:
1. In a diaphragm valve having a casing with a bore therethrough and a lateral opening extending inward from a clamping surface on the casing against which the margin of the diaphragm is clamped, a seating formed in the casing, an actuator matching the diaphragm in the closed position of the valve, a stud with its head embedded in the center portion of the diaphragm and threaded shank projecting from the center portion of the diaphragm on the inside, a nut separate from but located with axial play in the actuator into which the threaded shank of the stud screws, and means to move the actuator between a position in which it directly presses the diaphragm against the seating to close the valve without the nut pressing the shank of the stud and a position in which it retracts the diaphragm to open the valve by engaging the nut, the improvement which comprises an actuator in two parts, one part with a flat inner surface to engage a flat inner surface of the center part of the diaphragm and another part which is tubular with its lower end near to the inside of the flat bottom of the first part, this part having notches at diametrically opposite zones, said nut comprising two arms projecting oppositely and radially, said arms passing loosely into said notches with the sides of the notches constituting abutment surfaces for said arms, thereby to prevent substantial relative rotation of the arms in relation to the actuator while providing axial lost motion between the nut and actuator, sufficient to prevent pressure being exerted on the stud shank when the valve is closed.

2. A diaphragm valve according to claim 1 in which the nut member has arms constituted by the halves of a rectangular flange normal to the axis of the nut.

3. A diaphragm valve according to claim 1 in which the tubular part of the actuator is in one piece with a flange by the aid of which it is bolted to the first part of the actuator.

References Cited by the Examiner

UNITED STATES PATENTS

| | | | |
|---|---|---|---|
| 2,725,211 | 11/1955 | Boteler | 251—77 |
| 2,853,270 | 9/1958 | Boteler | 251—331 |
| 2,892,613 | 6/1959 | Boteler | 251—331 |
| 3,067,764 | 12/1962 | Geary | 251—331 X |
| 3,091,427 | 5/1963 | Boteler | 251—77 |
| 3,134,571 | 5/1964 | Boteler | 251—331 |

M. CARY NELSON, *Primary Examiner.*

A. ROSENTHAL, *Assistant Examiner.*